United States Patent [19]
Siegenthaler

[11] Patent Number: 6,113,737
[45] Date of Patent: Sep. 5, 2000

[54] METHOD AND UNIT FOR PRODUCING A ROAD VEHICLE RADIAL TIRE

[75] Inventor: Karl J. Siegenthaler, Pratteln, Switzerland

[73] Assignee: Bridgestone Corporation, Tokyo, Japan

[21] Appl. No.: 09/093,690

[22] Filed: Jun. 9, 1998

[51] Int. Cl.[7] .................................................. B29D 30/26
[52] U.S. Cl. ...................... 156/406.2; 156/126; 156/133; 156/415; 156/416
[58] Field of Search ................................. 156/123, 133, 156/111, 396, 406.2, 414, 415, 417, 416, 418, 419, 420, 130.7, 132, 398, 126, 400–403

[56] References Cited

U.S. PATENT DOCUMENTS

| | | |
|---|---|---|
| 1,577,664 | 3/1926 | Tew . |
| 3,125,482 | 3/1964 | Niclas et al. ............................ 156/414 |
| 3,607,558 | 9/1971 | Nebout .................................... 156/415 |
| 3,713,929 | 1/1973 | Botasso et al. ......................... 156/127 |
| 3,767,509 | 10/1973 | Gazuit .................................... 156/415 |
| 3,873,397 | 3/1975 | Leblond et al. ........................ 156/417 |
| 3,971,694 | 7/1976 | Gazuit .................................... 156/415 |
| 4,595,448 | 6/1986 | Sorioka .................................. 156/396 |
| 5,560,801 | 10/1996 | Siegenthaler .......................... 156/415 |
| 5,582,666 | 12/1996 | Irie ........................................ 156/111 |

FOREIGN PATENT DOCUMENTS

0 676 277 A2  10/1995  European Pat. Off. .

*Primary Examiner*—Geoffrey L. Knable
*Attorney, Agent, or Firm*—Michael Sand; John H. Hornickel

[57] ABSTRACT

A method and unit for producing a road vehicle radial tire, whereby an impermeable innerliner (10) is applied to the inner surface of a toroidal tire carcass (3) by placing the innerliner (10) on a substantially cylindrical inner support (13), which is radially deformable to gradually assume a deformed configuration capable of mating with an inner surface of the carcass (3); the inner support (13) being fitted through the toroidal carcass (3) and through a toroidal outer support (14) housing the carcass (3), and being moved into the deformed configuration to lift the innerliner (10) towards the carcass (3) and compress the innerliner (10) against the inner surface of the carcass (3), (FIGS. 1 and 2).

15 Claims, 6 Drawing Sheets

Fig.6

METHOD AND UNIT FOR PRODUCING A ROAD VEHICLE RADIAL TIRE

BACKGROUND OF THE INVENTION

1. Technical Field

The present invention relates to a method of producing a road vehicle radial tire.

More specifically, the present invention relates to a method of producing a radial tire from a toroidal inner carcass, preferably a woven carcass, having no impermeable innerliner.

2. Background Information

Tire carcasses are known to comprise an innerliner impermeable to air. When producing tires the conventional way on axially deformable tire building drums, the innerliner is placed on the undeformed drum, either on its own or in the form of a central portion of a strip comprising, in addition to the innerliner, two abrasion strips and two strips defining the sidewalls of the tire, and is covered with one or more plies and other component elements to form a multilayer tube, which is fixed at two points to the drum by fitting the drum with two metal beads on the outside of the tube. The drum is then collapsed axially so that a central portion of the tube is formed substantially into a U, and the two end portions of the tube are turned onto the central portion to enclose the beads and form a finished inner carcass.

Assembling the innerliner of an inner carcass produced using the conventional method described above poses no problems. The opposite applies, however, when dealing with toroidal, e.g. so-called "woven", inner carcasses, in which case, as opposed to being assembled simultaneously with formation of the inner carcass, the innerliner is assembled only after the inner carcass is already formed.

SUMMARY OF THE INVENTION

It is an object of the present invention to provide a straightforward, low-cost, reliable method of producing a radial tire from a toroidal inner carcass.

More specifically, it is an object of the present invention to provide a straightforward, low-cost, reliable method of assembling an innerliner inside an already formed toroidal inner carcass.

According to the present invention, there is provided a method of producing a road vehicle radial tire, the method involving the use of a toroidal inner carcass, and being characterized by comprising the steps of winding an innerliner onto an inner support, which is gradually deformable radially from a substantially cylindrical undeformed configuration to a deformed configuration capable of mating with an inner surface of said inner carcass; fitting said inner support through said inner carcass and a toroidal outer support housing the inner carcass; and moving the inner support into the deformed configuration to raise said innerliner towards said inner surface and compress the innerliner against the inner surface.

The present invention also relates to a unit for applying an impermeable innerliner inside a tire carcass.

According to the present invention, there is provided a unit for producing a road vehicle radial tire, the unit comprising a toroidal outer support for housing a carcass comprising a toroidal inner carcass, and being characterized by comprising an inner support, which supports a strip of elastomeric material comprising an impermeable innerliner, and is fitted through said inner carcass and said toroidal outer support; the inner support comprising a central portion defining first lifting means for raising said innerliner; and said central portion being gradually deformable radially from a substantially cylindrical undeformed configuration to a deformed configuration capable of mating with an inner surface of the inner carcass to raise said innerliner towards said inner surface and compress the innerliner against the inner surface.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
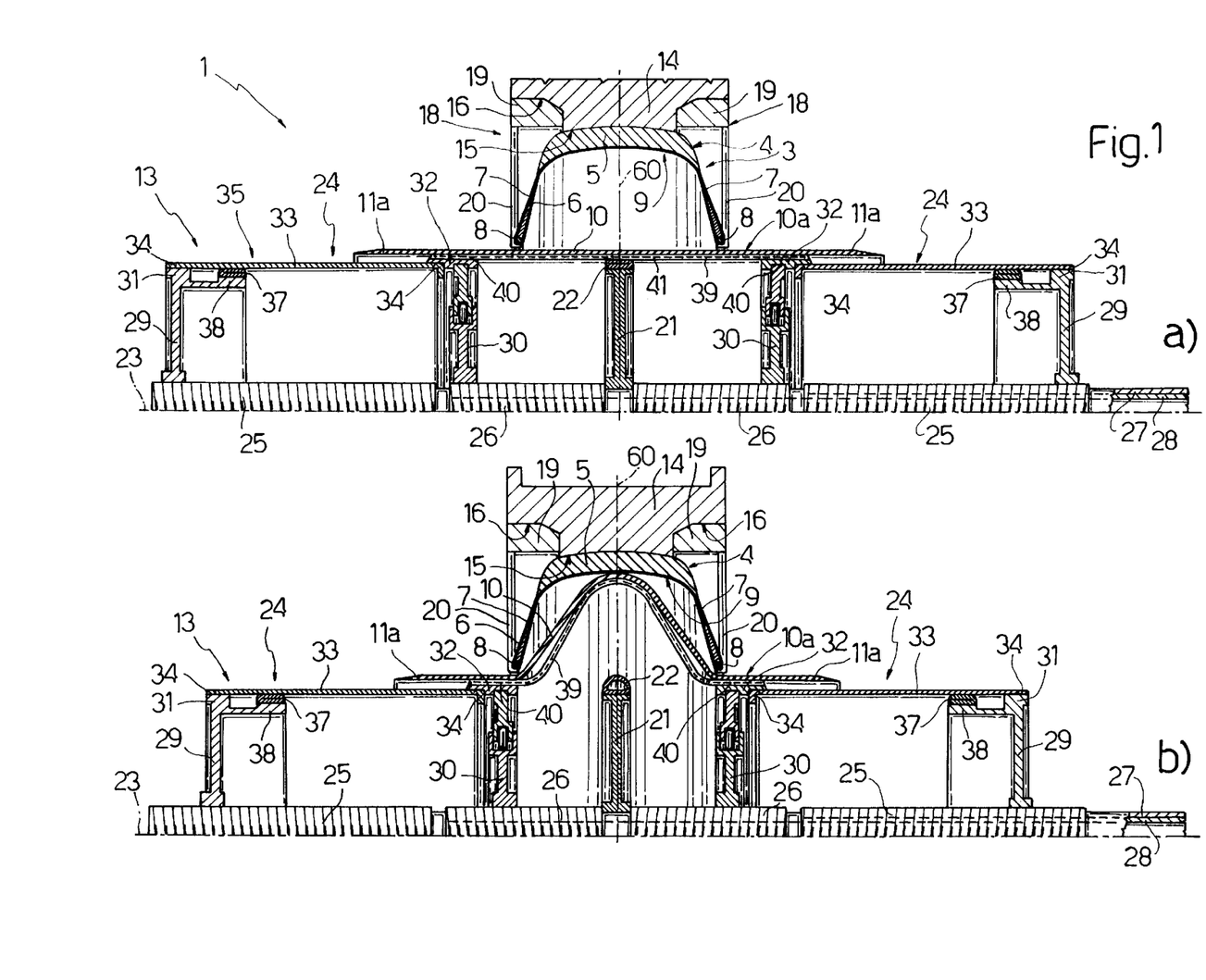
FIGS. 1a, 1b, 2a, 2b, 3a, 3b show schematic axial sections, with parts removed for clarity, of a preferred embodiment of the unit according to the present invention in six different operating positions.
Figure 2:
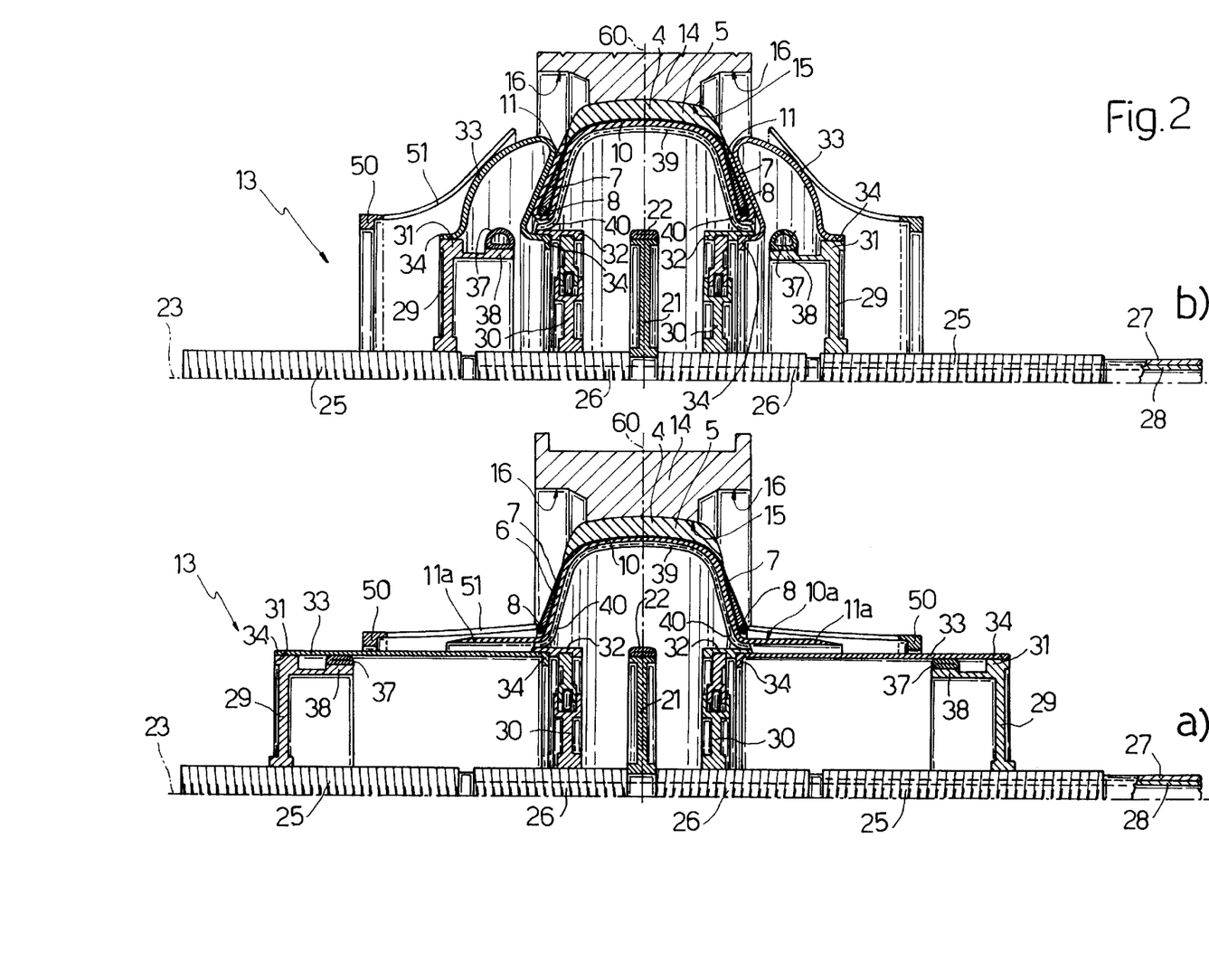
Figure 3:
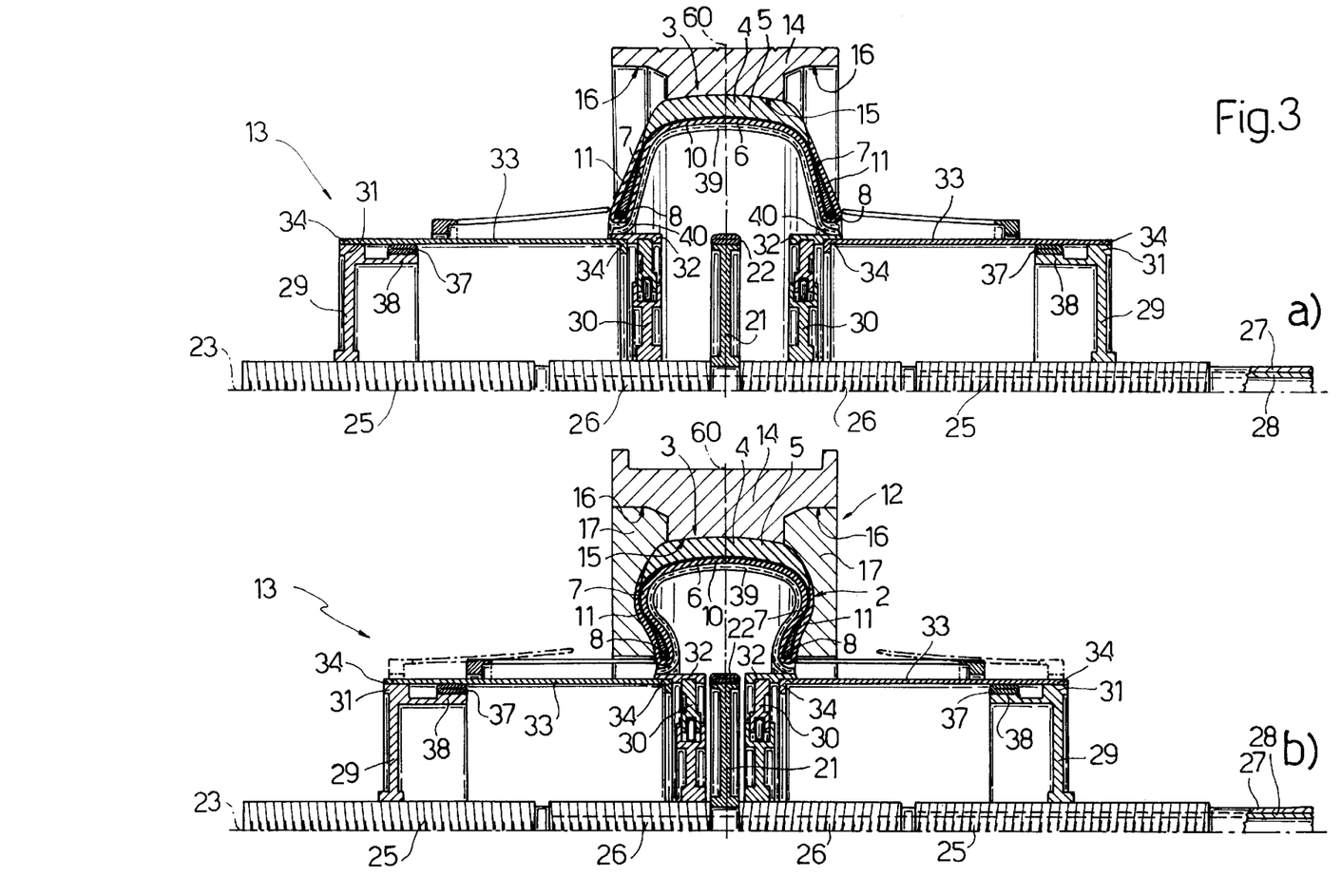

With reference to FIGS. 1 to 3, number 1 indicates as a whole a unit for producing a radial tire 2 (FIG. 3b) comprising a toroidal carcass 3, in turn comprising an outer carcass 4 defined at least partly by a tread ring 5, and a "woven" toroidal inner carcass 6 comprising two lateral walls 7, each enclosing a metal annular bead 8. Inner carcass 6 comprises a toroidal inner surface 9 lined with an impermeable innerliner 10, and the outer surface of each lateral wall 7 is covered with an outer annular layer 11 defining, together with respective lateral wall 7, a sidewall of tire 2.

Unit 1 comprises a toroidal forming mold 12 (FIG. 3b) and a building drum 13 extending through mold 12.

Mold 12 comprises a central toroidal body 14 defined internally by a toroidal surface 15 comprising two lateral grooves 16, each of which is fitted inside with a preferably click-in annular lateral plate 17 of mold 12.

As shown in FIGS. 1a to 3a, toroidal body 14, without lateral plates 17, houses carcass 3 with the outer surface of tread ring 5 contacting surface 15, and with lateral walls 7 of inner carcass 6 projecting inwards and fixed in position with respect to toroidal body 14 by means of respective annular clamping elements 18 (FIGS. 1a and 1b). Each annular element 18 takes the place of respective lateral plate 17 until this is fitted to toroidal body 14, and comprises an outer ring 19 fitted inside respective groove 16, and a number of radial arms 20 projecting inwards from relative ring 19, and the respective free ends of which comprise respective hooks for connection to the relative bead 8.

As shown particularly in FIGS. 1a and 1b, drum 13 comprises a fixed central annular plate 21 having a peripheral bladder 22 and an axis 23; and two half drums 24 symmetrical with respect to plate 21 and coaxial with each other and with axis 23. Being identical, only one of half drums 24 is described below.

Half drum 24 comprises two screws 25 and 26 coaxial with each other and with axis 23, and which are driven by respective shafts 27 and 28 so as to rotate about axis 23 in the same direction as each other and in the opposite direction to screws 25 and 26 of the other half drum 24. Half drum 24 also comprises an outer annular plate 29 and an inner annular plate 30 connected to respective screws 25 and 26 by means of respective screw-nut screw couplings, and the respective outer peripheries of which are fitted with respective cylindrical tubular elements 31 and 32 coaxial with axis 23. Tubular elements 31 and 32 are connected to each other by an elastically deformable tubular sleeve 33, which is preferably made of metal and, as shown more clearly in FIGS. 1 and 4, comprises two continuous end rings 34 connected by a central portion 35 divided into substantially longitudinal strips 36 by slits inclined with respect to axis 23. One of rings 34 is connected integrally to the outer surface of tubular element 31, whereas the other ring 34 is pressed inside tubular element 32. In the rest configuration, an intermediate portion of sleeve 33 is positioned contacting a bladder 37 supported on a tubular appendix 38 projecting from plate 29 towards plate 30, and which provides for maintaining strips 36 flexed slightly outwards when at rest.

Figure 4:
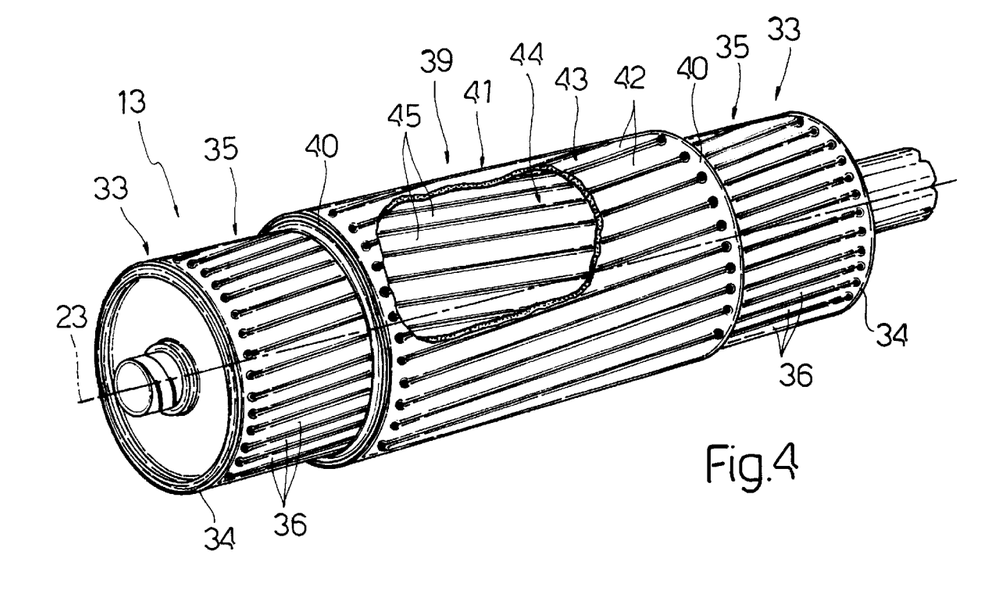
FIG. 4 shows a larger-scale view in perspective of a variation of a detail in FIGS. 1 to 3.

Tubular elements 32 of the two half drums 24 are connected to each other by an elastically deformable tubular sleeve 39, which is preferably made of metal and, as shown more clearly in FIGS. 1 and 4, comprises two continuous end rings 40 joined by a central portion 41 divided into substantially longitudinal strips 42 by slits inclined with respect to axis 23.

Figure 5:
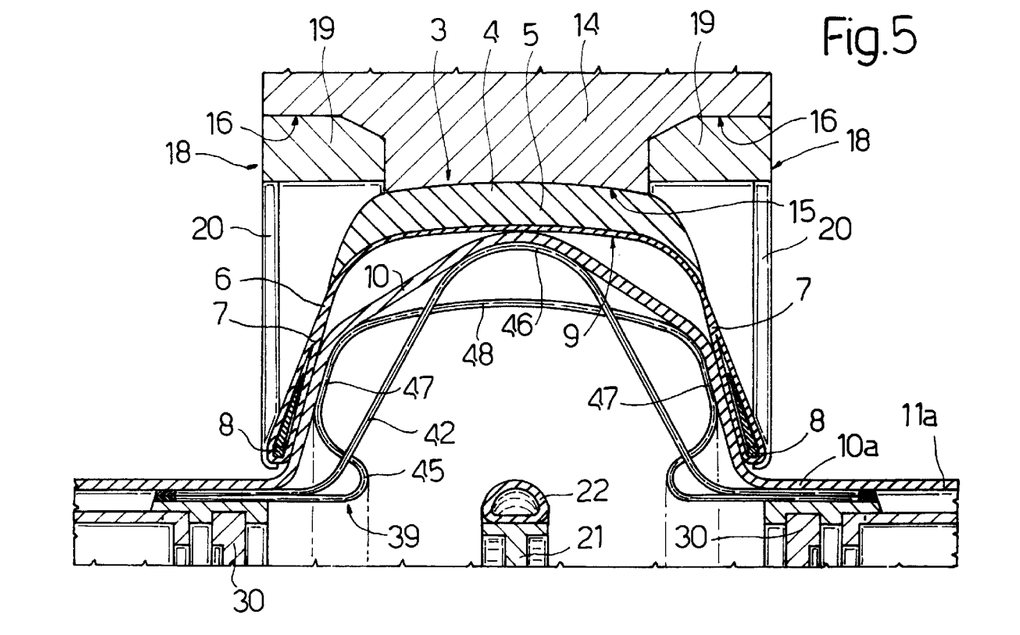
FIG. 5 shows a larger-scale view of a detail in FIG. 1b modified according to the FIG. 4 variation.
Figure 6:
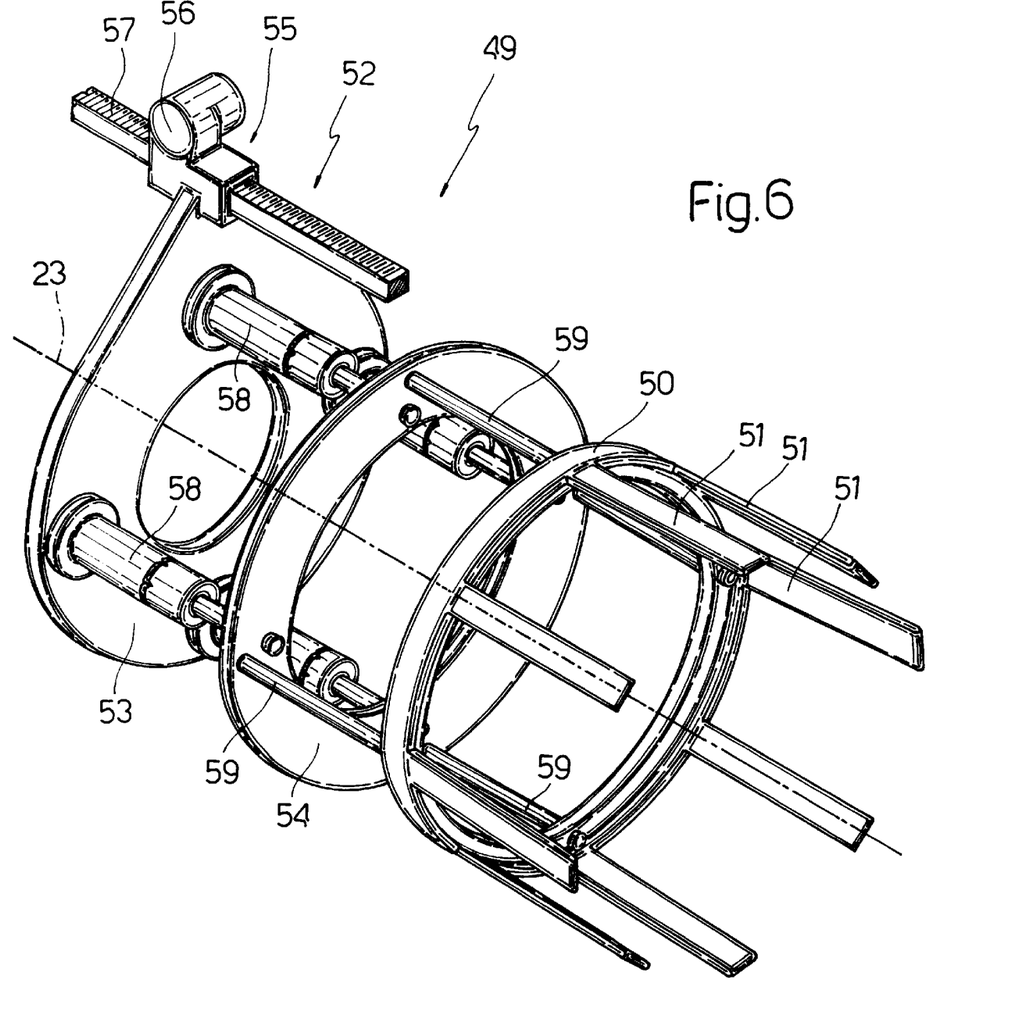
FIG. 6 shows a view in perspective of an accessory of the unit in FIGS. 1 to 3.

Sleeve 39 is normally defined by a single layer of strips 42, whereas sleeve 39 in the variation shown in FIG. 4 is defined by two superimposed tubular layers 43 and 44, the outer layer 43 of which comprises strips 42, and the inner layer 44 of which comprises a number of strips 45 inclined in the opposite direction to strips 42. As shown in FIG. 5, strips 42 comprise a weakened central portion 46, whereas strips 45 comprise two weakened portions 47 on either side of a more rigid central portion 48.

The axial ends of sleeve 39 are rigidly connected to the outer surfaces of respective tubular elements 32, whereas an intermediate portion of sleeve 39 is positioned, when in the rest configuration, contacting bladder 22, which provides for maintaining strips 42 (and 45) flexed slightly outwards when at rest.

For each half drum 24, unit 1 also comprises an accessory control and push device 49 for controlling the axial position of respective bead 8 of tire 2 in the absence of respective annular element 18 and respective lateral plate 17, while at the same time elastically compressing respective sleeve 33 against respective lateral wall 7 when sleeve 33 is deformed outwards (FIGS. 2b and 7a) by moving respective plate 29 towards respective plate 30, as explained in more detail later on.

Each device 49 comprises a ring 50 of an inside diameter larger than the outside diameter of respective half drum 24, and of an outside diameter smaller than the inside diameter of respective lateral plate 17; and a number of leaf-spring arms 51 projecting from and in an axial direction with respect to ring 50. Ring 50 is supported coaxially with axis 23, and is moved along axis 23 by an actuating device 52 comprising a first and second annular plate 53 and 54; plate 53 is suspended from a slide 55 moved by a motor 56 along a rack 57 parallel to axis 23; and plate 54 is interposed between plate 53 and ring 50, is connected on one side to plate 53 by a number of linear actuators 58 parallel to and equally spaced about axis 23, and is connected on the other side to ring 50 by a number of rods 59.

In actual use, toroidal body 14, housing carcass 3 and fitted with two annular elements 18 for fastening respective beads 8, is fitted onto drum 13, the sleeve 39 of which has been fitted on the outer surface with a strip 10a of elastomeric sheet material comprising a central portion defined by innerliner 10, and two lateral portions 11a defining flat-lying annular layers 11. Strip 10a is wound about drum 13 to form a cylinder, the end portions of which, each comprising a lateral portion 11a, project outwards of the corresponding ends of sleeve 39 and cover part of adjacent sleeves 33. The length of the cylinder formed by strip 10a on drum 13 is substantially equal to the length, measured along axis 23, of the cylindrical inner surface 9 of inner carcass 6.

Once toroidal body 14 and drum 13 are fixed with respect to each other, as shown in FIG. 1a, so that the plane of symmetry 60 of toroidal body 14 coincides with the plane of plate 21, shafts 27 and 28 (only one pair of which is shown) are operated to reduce the distance between plates 30 while maintaining a constant distance between each plate 30 and respective plate 29, and so gradually deform strips 42 of sleeve 39 outwards (FIG. 1b), so that the portion of innerliner 10 corresponding with the weakened portion 46 of strips 42 contacts a central portion of surface 9, and the rest of innerliner 10 adheres to surface 9 (FIG. 2a), with lateral portions 11a of strip 10a still projecting outwards of sleeve 39.

Innerliner 10 may thus adhere to surface 9 while at the same time enabling any air between inner carcass 6 and innerliner 10 to be expelled gradually through lateral walls 7, which, not yet being covered, are permeable to air.

Annular elements 18 are then removed, and rings 50 (FIG. 2a) are moved along respective sleeves 33 until the free ends of respective arms 51 contact walls 7 at respective beads 8, to prevent uncontrolled movement of beads 8 away from each other along axis 23.

Figure 7:
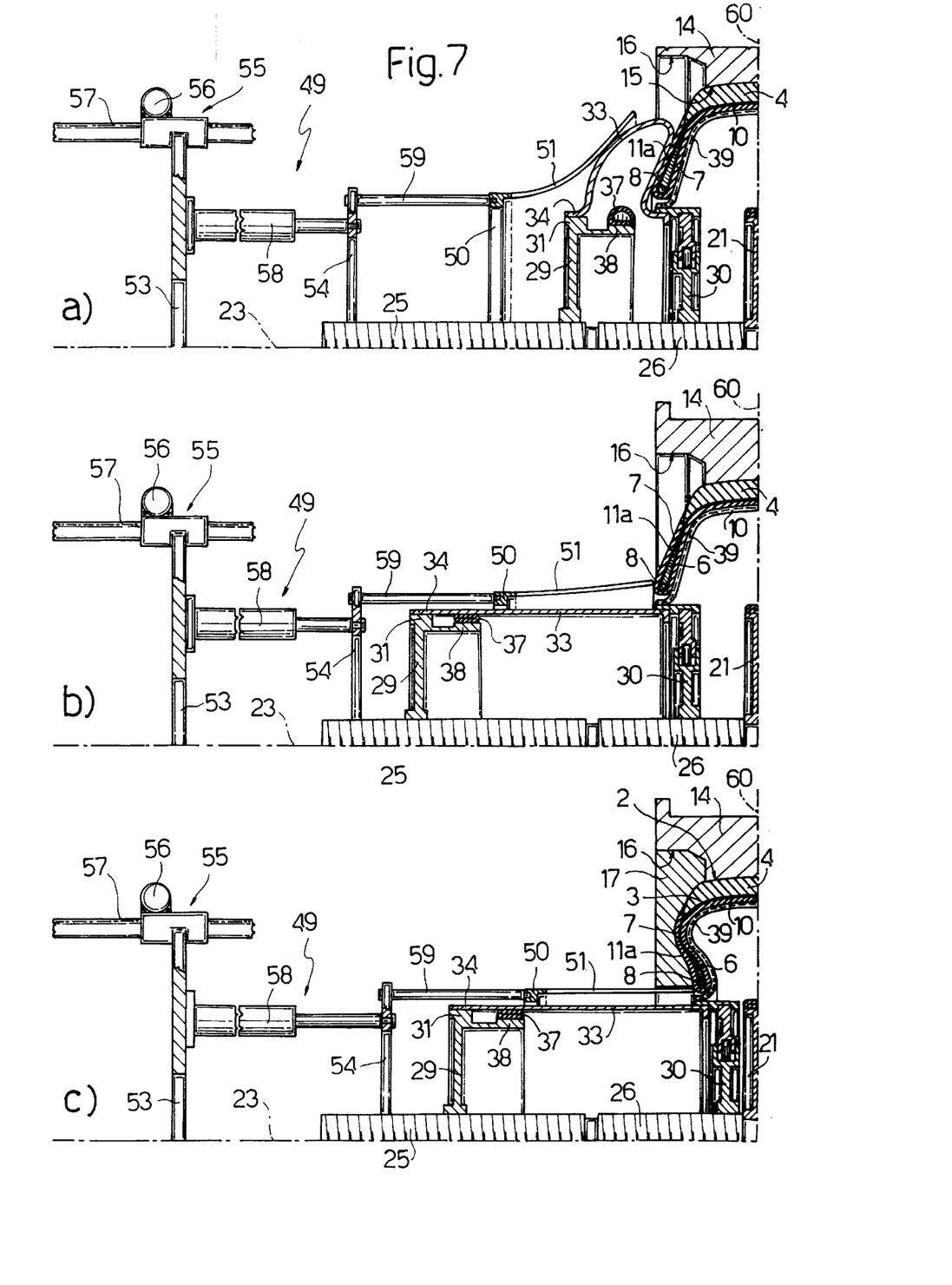
FIGS. 7a, 7b, 7c are similar to FIGS. 2b, 3a, 3b, and show the FIG. 1–3 unit equipped with the FIG. 6 accessory.

At this point, shafts 27 are operated to bring each plate 29 closer to respective plate 30 and gradually deform strips 36 of sleeves 33 outwards (FIGS. 2b and 7a) so as to fold lateral portions 11a of strip 10a onto the outer surface of walls 7 and form annular layers 11. The first end of sleeve 33 remains disposed at a constant diameter as shown in FIGS. 2b and 7a in both positions of sleeve 33. This movement is assisted by arms 51, which are deformed outwards by sleeves 33 and, resting on the outside of deformed strips 36 of sleeves 33, exert sufficient pressure to assist adhesion of respective lateral portion 11a to the outer surface of respective lateral wall 7.

To ensure outward deformation of strips 42 and 36, bladders 22 and 37 are inflated just before acting on screws 25 and 26.

At this point (FIGS. 3a and 7b), screws 25 are again operated to restore sleeve 33 to the undeformed position and bring the free ends of arms 51 back into contact with the portions of tire 2 at beads 8; and (FIGS. 3b and 7c) lateral plates 17 are fitted onto rings 50 to close mold 12 and flex arms 51 inwards to detach devices 49 from tire 2. When assembling lateral plates 17, motors 56 of the two devices 49 are operated to continuously control the positions of beads 8 with respect to each other and with respect to plate 21 as tire 2 is deformed by plates 17.

Finally, devices 49 are withdrawn away from plate 21 to enable mold 12 and tire 2 to be removed from drum 13.

In the FIGS. 4 and 5 variation, strips 42 and 45 are deformed simultaneously as plates 30 are moved closer to each other. More specifically, strips 42, as they are deformed at central portion 46, bring a central portion of innerliner 10 into contact with a central portion of surface 9, and strips 45 are deformed through the gaps defined by the deformed strips 42 and, by means of weakened portions 47, bring two end portions of innerliner 10 simultaneously into contact with the inner surface of lateral walls 7. Strips 42 and 45 thus form different shapes to support different portions of innerliner 10 as shown in FIG. 5.

I claim:

1. A unit for producing a road vehicle radial tire, the unit comprising:
    a toroidal outer support for housing a carcass having a toroidal inner carcass; the toroidal inner carcass having two lateral walls and two beads; the toroidal outer support and carcass having an inner opening;
    an inner support which is adapted to support an elastomeric strip having a pair of lateral portions disposed on either side of a central portion that forms an impermeable innerliner;
    the inner support having a central portion defining first lifting means for raising said innerliner;
    said first lifting means being gradually deformable radially from a substantially cylindrical undeformed configuration to a deformed configuration capable of mating with an inner surface of the inner carcass to raise said innerliner towards said inner surface and compress the innerliner against the inner surface;
    said first lifting means including an axially deformable central sleeve;
    said inner support including first actuating means for varying an axial length of said first lifting means;
    said first actuating means including a pair of coaxial, counter-rotating central screws, and a pair of first annular plates connected to said central screws by respective screw-nut screw couplings and integral with opposite ends of said central sleeve;
    said inner support including second lifting means for supporting the lateral portions of said elastomeric strip;
    said second lifting means including a pair of axially deformable lateral sleeves located on either side of said central sleeve and coaxial with said central sleeve;
    said inner support including second actuating means for axially compressing said lateral sleeves from a first position to a compressed position;
    each of the lateral sleeves having a first diameter when in the first position;
    each of said lateral sleeves pressing a lateral portion of the elastomeric strip against a lateral wall of the toroidal inner carcass when in the compressed position; and
    each of the lateral sleeves having a first end that moves toward a stationary second end when the lateral sleeve is in the compressed position; the first end being disposed at the first diameter when the lateral sleeves are in the first position and the compressed position.

2. A unit as claimed in claim 1, characterized in that said central sleeve comprises a number of side by side, controllably deformable flexible strips.

3. A unit as claimed in claim 2, characterized in that said flexible strips are inclined with respect to an axis of said central sleeve.

4. A unit as claimed in claim 1, characterized in that said second actuating means comprise a pair of counter-rotating lateral screws coaxial with said central screws and located on either side of said pair of central screws; and a pair of lateral annular plates, each of which is connected to a respective lateral screw by a respective screw-nut screw coupling.

5. A unit as claimed in claim 1, characterized in that each said lateral sleeve comprises a number of side by side, controllably deformable flexible strips.

6. A unit as claimed in claim 5, characterized in that said flexible strips are inclined with respect to an axis of the relative said lateral sleeve.

7. A unit as claimed in claim 1, characterized in that said inner support comprises second thrust means for exerting a radially outward thrust on said lateral sleeves in the undeformed configuration.

8. A unit as claimed in claim 7, characterized in that said second thrust means comprise a pair of inflatable annular second bladders.

9. A unit as claimed in claim 1, further comprising a pair of control and thrust members, each of which includes a first annular element; first activating means for regulating an axial position of said first annular element with respect to said inner support; a second annular element coaxial with the first annular element; and second activating means interposed between the first and second annular element to move the second annular element axially with respect to the first annular element; said second annular element including a number of flexible arms for axially retaining a respective bead of said toroidal inner carcass.

10. A unit as claimed in claim 9, characterized in that said second activating means includes a number of linear actuators.

11. A unit for producing a road vehicle radial tire, the unit comprising:
    a toroidal outer support for housing a carcass having a toroidal inner carcass; the toroidal outer support and carcass having an inner opening;
    an inner support which is adapted to support an impermeable innerliner;
    the inner support having a central portion defining first lifting means for raising said innerliner;
    said first lifting means being gradually deformable radially from a substantially cylindrical undeformed configuration to a deformed configuration capable of mating with an inner surface of the inner carcass to raise said innerliner towards said inner surface and compress the innerliner against the inner surface;
    said first lifting means being deformable axially;
    said inner support including first actuating means for varying an axial length of said first lifting means;
    said first lifting means including a central sleeve;
    said first actuating means including a pair of coaxial, counter-rotating central screws, and a pair of first annular plates connected to said central screws by respective screw-nut screw couplings and integral with opposite ends of said central sleeve; and
    said central sleeve including first and second superimposed layers, each of which is defined by a respective number of side by side, controllably deformable flexible strips; the first layer having a first shape when the first layer is deformed, the second layer having a second shape when the second layer is deformed; the first shape being different from the second shape whereby the first layer engages a different portion of the innerliner than the second layer.

12. A unit for producing a road vehicle radial tire, the unit comprising:
    a toroidal outer support for housing a carcass having a toroidal inner carcass; the toroidal outer support and carcass having an inner opening;
    an inner support which is adapted to support an impermeable innerliner;
    the inner support having a central portion defining first lifting means for raising said innerliner;

said first lifting means being gradually deformable radially from a substantially cylindrical undeformed configuration to a deformed configuration capable of mating with an inner surface of the inner carcass to raise said innerliner towards said inner surface and compress the innerliner against the inner surface;

said first lifting means being deformable axially;

said inner support including first actuating means for varying an axial length of said first lifting means;

said first lifting means including a central sleeve;

said first actuating means including a pair of coaxial, counter-rotating central screws, and a pair of first annular plates connected to said central screws by respective screw-nut screw couplings and integral with opposite ends of said central sleeve;

said central sleeve comprising two superimposed layers, each of which is defined by a respective number of side by side, controllably deformable flexible strips;

said flexible strips of each said layer being inclined with respect to an axis of said central sleeve; the flexible strips of each said layer being oppositely inclined with respect to the flexible strips of the other layer and with respect to a longitudinal axis of said central sleeve.

13. A unit as claimed in claim 12, characterized in that said flexible strips include given weakened portions; the weakened portions of the flexible strips of one of said layers differing from the weakened portions of the flexible strips of the other layer.

14. A unit as claimed in claim 12, characterized in that said inner support includes first thrust means for exerting an initial radially outward thrust on said central sleeve in the undeformed configuration.

15. A unit as claimed in claim 14, characterized in that said first thrust means includes an inflatable annular first bladder contacting the inner surface of said central sleeve in the undeformed configuration.

* * * * *